Figure 2:
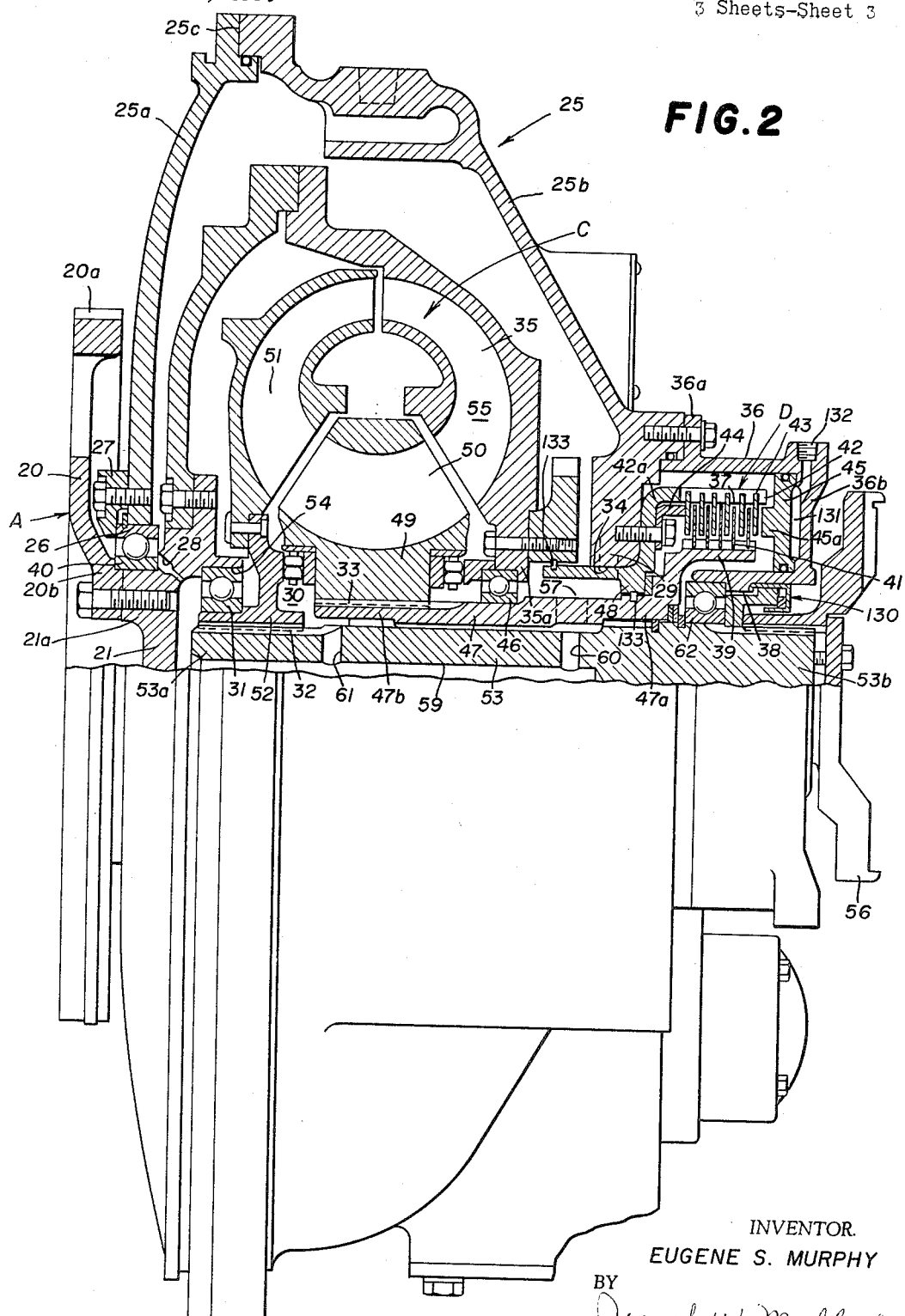

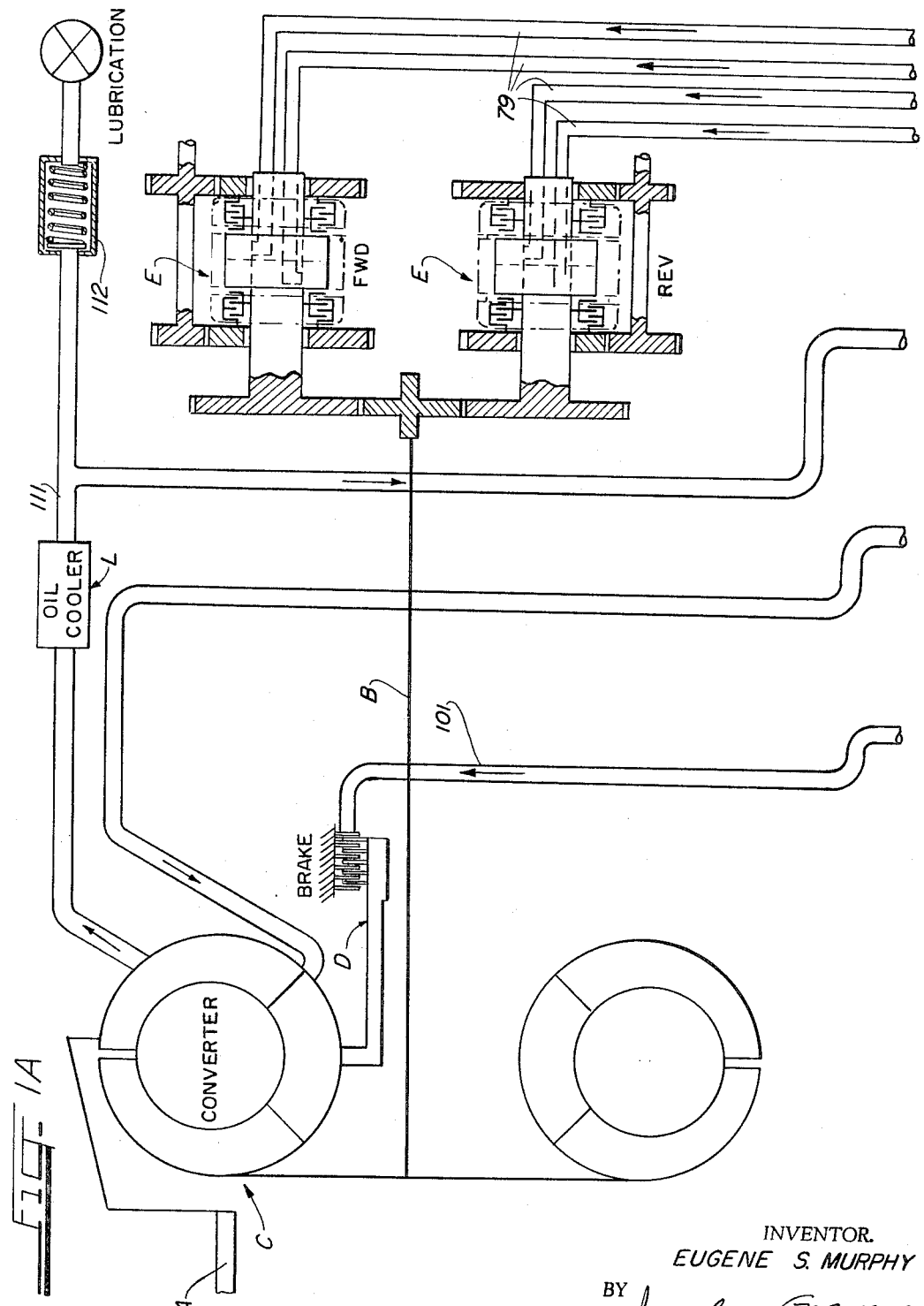

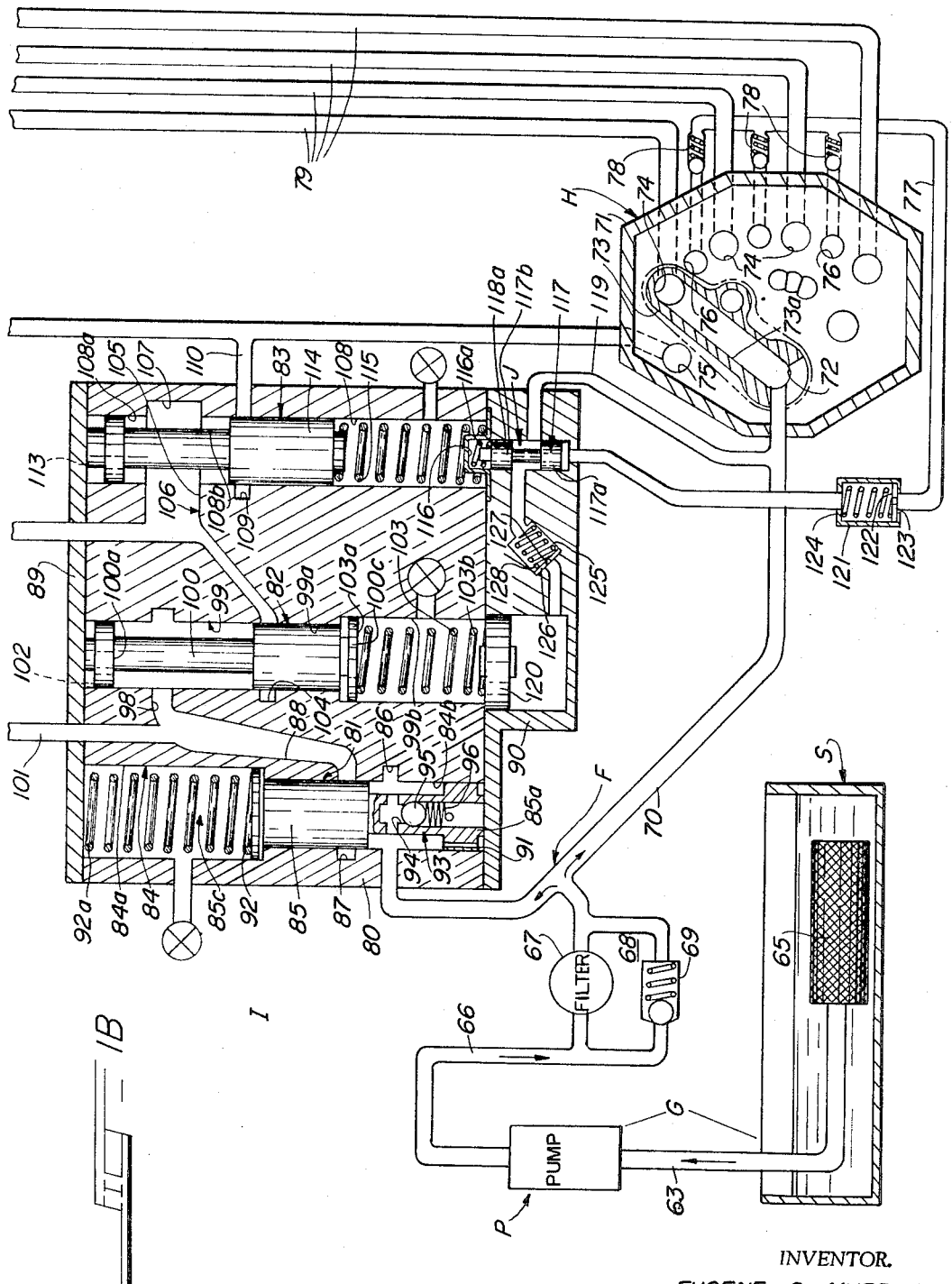

United States Patent Office 3,326,065
Patented June 20, 1967

3,326,065
HYDROKINETIC AND MECHANICAL GEAR DRIVE
Eugene S. Murphy, Rockford, Ill., assignor to Borg-Warner Corporation, Chicago, Ill., a corporation of Illinois
Filed Nov. 23, 1964, Ser. No. 413,252
4 Claims. (Cl. 74—732)

This invention relates to power transmissions and more particularly to transmission employing a hydrodynamic coupling in series with a mechanical gear box, the latter being selectively changed by actuation of one or more hydraulic devices.

Vehicles having large torque requirements, particularly those in the earth moving field, have utilized hydrodynamic torque converters as a component of their transmission systems because of the advantages of the fluid cushion in the drive system and the characteristic smooth acceleration and deceleration. However, certain difficulties are encountered in changing between speed ratios of the mechanical gear box while the torque converter is maintained in full driving relationship; one of the difficulties is shock which may be experienced upon completion of a gear shift. A typical example of prevalent shock is experienced in crawler tractors, of the type having a hydrodynamic drive, when the vehicle is reversed in direction preceded by full throttle forward movement into a heavy load such as stumps. Also, in front-end loader earth moving vehicles, considerable shock is frequently experienced when the bucket is lifted high from a pile and the vehicle is then placed in a forward or reverse gear to permit the vehicle to back off or move away from the pile.

Therefore, a primary object of this invention is to provide a power transmitting mechanism of the type having a mechanical gear box with a plurality of speed ratios selected by operation of a manual means controlling a plurality of hydraulic clutches, and has other hydraulic controls effective to selectively interrupt the power transmitting capabilities of the torque converter with respect to said mechanical gear, said interruption being accompanied by modulation.

Another object is to provide a transmission mechanism having a torque converter connected in series driving relationship with a mechanical gear box and employing a hydraulically actuated device for controlling the operation of the state or reaction element of the torque converter, said hydraulic control device being effective to interrupt the normal torque multiplying capabilities of said torque converter in response to a shift of said mechanical gear box and to return said torque converter to the normal torque multiplying condition in a modulated manner after the completion of said mechanical gear change.

Another object of this invention is to provide a transmission mechanism having a torque converter connected in series driving relationship with a mechanical gear box, and control means employing a plurality of pressure regulating valves each connected in a cascade relationship; a first regulator valve being effective to regulate supply pressure which is selectively communicated to certain of the plurality of hydraulic actuating devices controlling the speed ratio of said gear box a second regulator valve being normally biased by a fluid diverter means regulating fluid pressure supply by a hydraulic brake controlling the effectiveness of the stator or reaction element of the torque converter whereby the torque multiplying characteristics of said torque converter may be interrupted or restored and a third pressure regulating valve effective to regulate the pressure supply to said torque converter for maintaining a filling of same, said control means being responsive to a change in position of a selector controlling actuation of said hydraulic devices for said gear box to overcome said fluid diverter means and thereby reduce pressure communicated to said brake to interrupt the torque multiplying characteristics of said torque converter during said change.

Other objects, advantages, novel aspects of the invention will become apparent upon the following detailed description in conjunction with the accompanying drawings wherein:

FIGURE 1A and FIGURE 1B comprise a generally schematic illustration of a power transmitting mechanism, showing certain of the elements in cross-section, and embodying the principles of this invention; and FIGURE 2 is an elevational view, partly shown in central section, of the torque converter hydraulic brake regulating the operation of the stator element for the mechanism shown in FIGURE 1.

Turning now to the drawings, more particularly to FIGURE 1, the power transmitting mechanism of this invention broadly comprises rotative input means A, and a rotative output means B, a hydraulic torque converter or hydrodynamic coupling C drivingly connected to the input means A, a mechanical transmission means or gear box M having a plurality of gears providing for variable speed ratios, said mechanical gear means being interconnected with said torque converter and the output means B. A hydraulically actuated friction device D is employed to regulate the effectiveness of the stator element and as a reaction for the torque converter by providing a selective disconnection between a fixed element and said stator; a plurality of hydraulically actuated friction devices E are provided for selection of one of a plurality of speed ratios of said mechanical means M. A hydraulic control means F is employed comprising a supply means G having a pump P effective to draw fluid from a sump S, and having a manual selector means H effective to communicate said supply means with one of a plurality of said hydraulic friction devices E for operating said mechanical means, said control means F having a pressure regulating means I employing a plurality of regulating valves connected in cascade fashion, said regulating means also including a fluid diverter J for biasing certain of said regulating valves for maintaining a normal supply of pressure to said hydraulic device D. The regulating means also has a pressure responsive delay means K effective to graduate the engagement and reengagement of said hydraulic device D. The control means includes conventional components such as a cooler L and lubrication means (not shown).

Turning now in more particularity to the components thereof, the input means A comprises a conventional ring gear 20 having teeth 20a provided on the outer periphery thereof for a driving connection to an engine or prime mover (not shown); the hub 20b of ring gear 20 has input flange 21 coupled thereto.

The torque converter C has an annular housing 25 comprised of a front portion 25a and a rear portion 25b sealingly interconnected at 25c. The front portion 25a has a central opening 26 for receiving the hub 21a of flange 21 therein by bearing 40 disposed between the wall of opening 26 and the outer surface of hub 21a. A retainer 27 is employed to stabilize the bearing 40 and passage 28 communicates converter fluid with the bearing 40. The rear portion 25b of the housing carries a mounting wall to which is attached structure of clutch D.

The torque converter C has impeller 35 provided with a hub portion 35a which is rotatatively supported by a bearing 46 which in turn is journalled about an intermediate sleeve shaft 47. The sleeve shaft 47 has one end 47a journalled within an opening 48 of a portion of brake D which in turn is supported by and extends through an opening 34 of the rear housing portion 25b and is fixed therewith. The other end 47b of the sleeve 47 carries a plurality of splines 33 which are intermeshed with the complementary splines formed on the interior surface of hub 49 forming part of the stator element 50 of the torque converter.

Turbine 51 of the torque converter is drivingly carried upon a hub member 52 which has a plurality of internal splines 32 drivingly keyed to complementary splines formed upon one end 53a of an intermediate output shaft 53 for the converter; the hub member 52 is journalled within a central opening 54 defined within an annular lip 21b of flange 21 by a bearing 31; opposite end 53b extends outwardly of the housing 25 and has ears 56 to which may be connected input elements of the mechanical gear box M. The impeller 35, stator 50 and turbine 51 together define a toroidal fluid chamber and are arranged in the hydraulic circuit to constitute a two phase converter of the single stage type.

The toroidal torque converter chamber 55 is filled with fluid from inlet conduit 29 which communicates with a space 57 opening to the leading edge of the impeller element 35. Said fluid supply from conduit is also communicated to the trailing edge of the turbine by a radial bore 60 leading to an axial bore 59 in the intermediate shaft 53 and which communicates with bore 61, the latter extending radially outwardly to space 30 adjacent turbine 51.

The hydraulic brake which is effective to operate the stator 50 for interrupting the torque multiplying characteristics of the torque converter, comprises a cylindrical housing 36 having an annular lip 36a at one end thereof attached to the mounting wall of the rear portion 25b of the housing 25. The housing has a generally flat end wall 36b and a radially inner cylindrical wall 38 defining therein a generally cylindrical chamber 37. One end 38a of the radially inner wall 38 is journalled by a bearing 62 supported on the shaft 53; a seal assembly 130 is employed to maintain a stable relationship between the radially inner wall 38 and the inner race of the bearing 62. A rotating drum portion 39 is formed on end 47a of the sleeve shaft 47 and carries thereon a plurality of spaced annular flat discs 41 drivingly splined thereon. A fixed cylindrical drum 42 has an end portion provided with a radially extending flange 42a attached to the mounting wall of the rear portion 25b of the housing 25; extending inwardly of the torque converter is flange 34 integrally formed as part of the drum member 42 and which is sealed by appropriate means 133. A plurality of flat annular disc 43 extend radially inwardly from the drum 42 and are interleaved with the discs 41 of the rotating drum and are arranged so that they may be brought into frictional contact by appropriate force for providing a frictional connection therebetween. A reaction ring 44 for the plurality of discs is mounted upon the interior of drum 42 and attached to the inner wall 42a and is generally aligned with the pressure portion 45a of a piston 45 slideably disposed within the chamber 37 of the housing 36. The piston 45 cooperates with housing 36 in defining a pressure cavity 131 having a fluid inlet 132 supplied with pressurized fluid as will be described.

Turning now to FIGURES 1A and 1B, the control means broadly designated as F has a fluid supply G comprised of sump S having a container from which is drawn fluid through a conduit 63 communicating with a pump P of any conventional type such as rotary gear type. The sump S has a filter 65; the output of the pump P is carried by a conduit 66 which would normally flow through a filter 67 or through a passage 68 in parallel connection with filter 67, passage 68 having a ball check valve 69 which may be effective to open, for example, at 15 to 20 p.s.i. Said supply pressure is communicated first to the manual selector means H by a conduit 70.

The selector valve H has a housing 71 provided with a high pressure inlet 72 in communication with conduit 70; a selector arm 73 is journalled about the inlet 72 and has a passage-way 73a therein effective to communicate the outer extremity of the arm with one of the plurality of fluid outlets 74, said fluid outlets being arcuately arranged in the bottom portion of the housing 71. A low pressure fluid inlet 75 is also disposed in the bottom portion of the housing 71 and is effective to maintain all of the non-selected outlets 74 full of low pressure. One each of a modulating outlet or orifice 76 is interposed between the fluid outlets 74; said orifices all being commonly connected to a conduit 77 and in each having a ball check valve 78 effective to permit fluid to flow unidirectionally through when above a predetermined pressure.

The hydraulic clutches E each have dual actuating chambers (not shown) for actuating said clutches in one of two opposite directions for selecting a specific gear ratio. Each of said actuating chambers is in communication with one outlet 74 of said selector means by virtue of one of a plurality of conduits 79; said double acting clutches may be of the type disclosed in U.S. Patent No. 2,979,963 commonly assigned to the assignee of this application and the disclosure of said patent is incorporated herein by reference.

The pressure regulating means I comprises a valve block 80 having a first regulator valve assembly 81, a second regulator valve assembly 82 and a third regulator valve assembly 83. The first regulator valve assembly comprises a cylindrical stepped bore 84 having a first portion 84a and a reduced portion 84b with a valve spool 85 slideable therein. An annular groove 86 is defined in the wall of the bore 84 and is in fluid communication with conduit 70 for receiving supply pressure from said pump P. Spaced from said groove 86 is another annular groove 87 communicating with a passage 88 leading in cascade fashion to an inlet to the second regulator valve assembly 82.

The valve spool 85 has a bottom annular land 85a provided with an orifice 91 communicating the space between the lands 85a and 85b with the head of the bore 84 thereby permitting pressure to exert a force upward toward a coiled spring 92 having a predetermined rate for regulating the main pressure supply which is fed to the clutches by way of the selector means. The coiled spring 92 has one end 92a bearing against the top plate 89 and a bottom portion bearing against the flanged head 85c of valve spool 85. A supplementary control 93 employs a check valve comprised of internal passages 94 communicating the space between the lands 85a, 85b with the head of the valve assembly 81. A ball valve member 95 is urged by spring 96 to open at a predetermined pressure permitting passage of controlled fluid to the head of the valve.

The valve assembly 82 is primarily a converter pressure limit valve having a fluid inlet 98 communicating passage 88 with an internal stepped cylindrical bore 99 extending between the top plate 89 and the bottom block 90. Stepped bore 99 has a first portion 99a and an enlarged portion 99b with a valve spool 100 slideable in the smaller portion 99a. Fluid pressure received from the first valve assembly 81 is communicated from passage 88 to the brake-actuating chamber 58 of the brake by way of conduit 101. Spool 100 has an orifice 102 provided in the upper land 100a which permits pressure to be communicated to the head of the valve and thereby exert a downward pressure on the valve member against the effect of a coiled spring 103 having a predetermined rate for regulating the disconnect clutch supply pressure. Spring 103 has one end 103a bearing against the bottom head 100c of the valve member and another end 103b bearing against a slideable piston forming part of the fluid diverter J as will be described. The bore 99 has an annular groove 104 spaced from the fluid inlet 98 and communicating with the fluid inlet of valve assembly 83 by passage 105.

Regulator valve assembly 83 comprises a fluid inlet 106 comprising in part an enlarged annular groove 107 defined in the wall of a cylindrical stepped bore 108 extending through the valve body between the top plate 89 and the bottom block 90. Stepped bore 108 has a first portion 108a and an intermediate portion 108b. Another annular groove 109 is provided in spaced relation to the first fluid inlet 106 and communicates, by way of conduit 110, with a low pressure inlet to the manual selector means as well as with the outlet 111 of the oil cooler L which leads to the transmission lubrication system; a pressure regulator valve 112 is placed in the line communicating the outlet of the oil cooler with the lubrication system.

An orifice 113 is provided in the upper land of the valve spool 114 communicating fluid pressure to exert a downward force against a regulating spring 15. The regulating spring has an upper end bearing against the valve spool 114 and a bottom end bearing against a cupped retainer 116 which cradles a regulating spring as will be described.

Each of the stepped portions of the respective bores 84, 99 and 108 of the above valve assemblies have a communication labeled exhaust for returning to sump.

The fluid diverter J is comprised of the moveable piston 117 slideable in one portion 118a of a stepped bore 118 defined in the bottom block 90. High pressure supply fluid is normally communicated between the lands 117a and 117b of piston 117 by a conduit 119 as said piston is normally biased downwardly by spring 116a to subject fluid pressure against the bottom of piston 120 assisting the regulating force of spring 103 of the disconnect clutch limiting valve 82. Should the supply pressure be relieved from such normal diversion against said piston 120, the piston 120 would drop thereby decreasing the spring rate allowing the brake supply pressure to drop and thereby release said clutch.

Means for overcoming said normal fluid diverter J, in response to movement of the selector arm for changing the speed ratio of said gear box, employs a plurality of conduits 76 leading from the bottom of the selector valve and through a principle conduit 77 to one end of piston 117, the communicated pressure being effective to overcome the bias of spring 116a shifting piston 117 upwardly and blocking fluid from conduit 119 to bias piston 120 downwardly resulting in the disconnection of clutch D.

Upon the completion of a speed ratio change, high pressure fluid from conduit 70 is no longer communicated through said pluralities of passages 76 to the bottom of piston 117 and piston 117 is urged to return to its normal communicating position. The modulator delay means K is employed to graduate the movement of piston 117 to or from the normal communicating position. Such delay means comprises a first check valve 121 interposed in conduit 77 to regulate movement of piston 117 away from its normal communicating position and has a valve disc 122 provided with a small orifice 123 therein; the valve disc is normally urged closed by a spring 124 and opens at a predetermined pressure. The check valve 121 is phased whereby fluid normally flows through the small orifice 123 until such time that pressure is sufficient to force open the disc against spring pressure and thereby permit full fluid flow. Also, a second check valve 125 is interposed between bore 118 and the piston 120 to regulate return of piston 117 back to the normal communicating position and comprises structure similar to valve 121 wherein there is a disc 126, an orifice 127 and spring 128. Valve 125 phases the flow of fluid away from piston 120 to sump.

In operation, the normal power transmitting condition of the control system consists of having the fluid pressure derived from pump P regulated at three pressures by way of regulator means I for the various needs of the transmission. A first predetermined pressure is governed by the valve assembly 81 under the action of spring 92; this first pressure is communicated by way of conduit 70 to the selector valve H at the inlet 72 thereof and is available to maintain any of the clutches E in an engaged condition if so permitted by alignment of the selector arm 73 (which has an internal conduit 73 therein) with and of the spaced ports 74. The spill-off of the valve assembly 81 is cascaded to the valve assembly 82 to determine a second predetermined pressure by the combined action of spring 103 and the fluid biased member 120. This second pressure is normally communicated by way of conduit 101 to brake D to hold the reactor of the torque converter. The spill-off of valve assembly 82 is cascaded to valve assembly 83 for determining a third predetermined pressure under the action of spring 115; the third pressure is communicated to the torque converter for maintaining a filling thereof and is continuously circulated therethrough.

The interior of the selector means H, the spill-off of the last valve assembly 83 by means I, and the outlet from the torque converter housing are all returned to the sump S by way of conduit 111 or other suitable connections to complete the hydraulic circuit. The hydraulic lines or conduits leading to the clutches E are all supply lines since the action therein is hydrostatic and need not have circulation. In this normal power condition of the transmission, the torque converter receives pressure and, since the brake D is receiving pressure, the reactor is held stationary to promote torque multiplication within the converter; the power received from the torque converter is conveyed in series to the gear box M which is at a selected speed ratio.

If a change in speed ratio within the gear box M is desired, the selector arm 73 in rotated about the journalling conduit 73 so as to move the outer end of the arm 73 (having a nipple or fluid outlet) into alignment with one of the other ports 74 leading to another clutch. However, in re-aligning the selector arm 73, the nipple *must* transgress across one of the intermediate ports 76 which are interposed in the arcuate path or arrangement of ports 74. In so doing, a momentary pressure signal is injected into the conduit 77 which is effective to actuate the pressure responsive shut-off valve J to eliminate the hydraulic bias on member 120 thereby removing one of the forces regulating the second predetermined pressure conveyed to the brake D. In so doing, the brake pressure is substantially reduced causing the brake to be disengaged. Delay means K is employed to modulate the rapidity of action of relieving the brake pressure as well as restoring the brake pressure.

While I have described my invention in connection with one specific embodiment and other alternative embodiments thereof, it is to be understood that these are by way of illustration and not by way of limitation and the scope of my invention is defined solely by the appended claims which should be construed as broadly as the prior art will permit.

I claim:

1. In a power transmission having a variable speed ratio gear train and a hydrokinetic torque converter arranged in series, said torque converter having a reactor, a hydraulic control system for said transmission comprising: a source of fluid pressure; a plurality of hydraulically actuated clutches effective to vary the speed ratio of said gear train; at least one hydraulically actuated brake for holding said reactor; means communicating said fluid pressure source with all of said torque converter, brake and clutches; a hydraulic selector means interposed in the fluid communication to said clutches and movable between discrete positions for selectively regulating the fluid communication to at least one of said clutches; a pressure regulator means interposed in all said fluid communicating means and having one portion effective to normally regulate the fluid communication to said selector means at a first pressure, a second portion to regulate fluid communication to said brake at a second pressure, and a third portion to regulate fluid communication to said converter at a third pressure; and means responsive to a change of said selector means between said discrete positions for modulating said second portion of the regulating means controlling the fluid pressure communicated to said brake for substantially reducing said second pressure resulting in disengagement of said brake only during said change.

2. A hydraulic control system as in claim 1, in which said selector means comprises a movable fluid connector having one portion continuously in communication with said first fluid pressure and another portion adapted as a fluid outlet, said selector further having a housing with a plurality of spaced ports adapted to register with said connector outlet for defining said discrete positions; said change-responsive means comprising intermediate ports defined on said selector means and interposed between said spaced ports in a manner whereby said fluid connector may register the fluid outlet thereof with any of said intermediate ports during a change between discrete positions, first conduit means normally communicating said first pressure with said second portion of said pressure regulator means to constitute a fluid bias for regulating said second pressure, a pressure actuated cut-off valve interposed in said first conduit means, second conduit means normally communicating said intermediate ports with said cut-off valve for actuating said cut-off valve to a closed position whereby fluid introduced into said intermediate ports during a change of said fluid connector will result in dissipation of said second fluid pressure to release said brake.

3. A hydraulic control system as in claim 2, in which said fluid communication between said intermediate ports and pressure actuated valve has pressure responsive delay means incorporated therein for graduating the actuation of said last named valve, and the fluid communication with said regulator means for governing said second pressure has interposed therein a pressure responsive delay means for graduating the dissipation of fluid therefrom.

4. A hydraulic control system as in claim 3, in which each pressure responsive delay means comprises a valve seat and a disc valve normally biased to a closed position against said seat, said disc valve having a central opening therethrough for regulating a first phase of fluid communication and being movable from its valve seat for determining a second phase of fluid communication.

References Cited
UNITED STATES PATENTS

| | | | |
|---|---|---|---|
| 1,960,705 | 5/1934 | Kochling | 192—3.2 |
| 2,965,202 | 12/1960 | Christenson | 192—3.2 |
| 3,058,373 | 10/1962 | Snoy et al. | 74—732 |

JULIUS E. WEST, *Primary Examiner.*